T. C. WHITEHEAD.
TRACTOR WHEEL.
APPLICATION FILED JAN. 10, 1921.
1,431,203.
Patented Oct. 10, 1922.
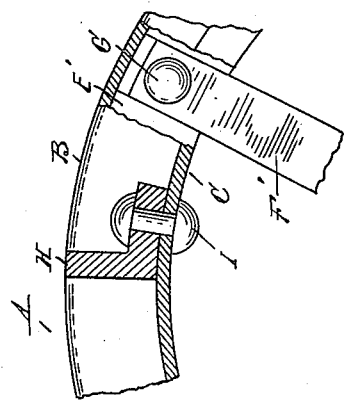
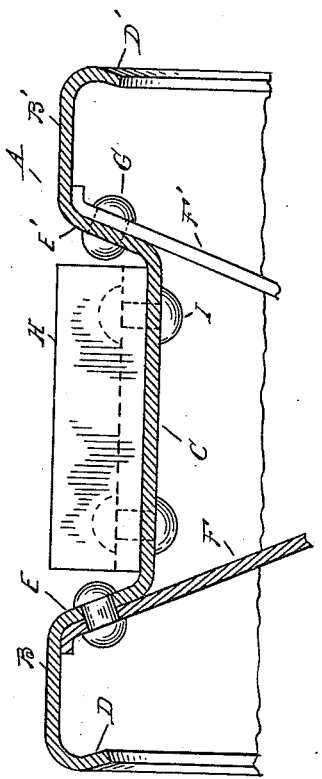
Inventor
Thomas C. Whitehead
By
Attorneys Patented Oct. 10, 1922.

1,431,203

UNITED STATES PATENT OFFICE.

THOMAS C. WHITEHEAD, OF DETROIT, MICHIGAN.

TRACTOR WHEEL.

Application filed January 10, 1921. Serial No. 436,135.

*To all whom it may concern:*

Be it known that I, THOMAS C. WHITEHEAD, a citizen of the United States of America, residing at Detroit, in the county of Wayne and State of Michigan, have invented certain new and useful Improvements in Tractor Wheels, of which the following is a specification, reference being had therein to the accompanying drawings.

The invention relates to tractor wheels and has for its object the obtaining of a construction in which the traction of the wheel is increased by cross cleats on the periphery thereof, while injury to a hard road or pavement from these cleats is effectually prevented. It is a further object of the invention to combine with the rim construction an advantageous spoke construction, and with these objects in view the invention consists in the construction as hereinafter set forth.

In the drawings:

Figure 1 is a cross-section of a portion of the rim of a tractor wheel, to which my improvements are applied;

Figure 2 is a sectional side elevation thereof.

In the construction of tractor wheels it is usual to provide the same with cross cleats so as to increase the traction when operating in soft ground. It is, however, frequently necessary for the tractors to pass over hard roads or pavements and the weight of the machine when bearing upon the cleats is sufficient to cause injury. With my improved construction the rim of the wheel is formed with an annular recess in the central portion thereof and the cross cleats are arranged within this recess with their outer edges in alignment with the periphery of the outer edge portions of the rim. Thus when traveling over hard ground, the weight would be sustained by these outer peripheral portions holding the cleats from contact, while on soft ground the wheel will be depressed, bringing the cleats into engagement with the earth. A further advantage of my construction is that I utilize the depressed central portion of the rim as a means of attachment for the spokes, so that the latter may be riveted in place without bending. This will place the rivets in shear and will avoid weakening the spokes as is the case where they are bent before attachment.

In detail, A is the rim which is of a cross section having the outer edge portions B and B' and the central annular depressed portion C. At the opposite edges are inturned flanges D and D', while the central depressed portion C has side walls E and E' which are at an angle corresponding substantially to the direction of the spokes F and F'. Thus these spokes may be readily secured to the rim by rivets G, as shown. H are cross cleats which are of a length no greater than the portion C and are of a height corresponding to the depression of said portion so that the outer edges will be flush with the portions B and B'. These cleats are secured by suitable means, such as the rivets I, and are suitably spaced around the wheel.

With the construction as described, the form of cross-section of the rim is one which can be readily produced by rolling and is so thrust as to give great strength, therefore permitting of the use of lighter gauged metal than with a straight-sectioned rim. Also, the cross cleats H arranged within the recess in the rim form an additional reinforcement for strengthening the same. The spokes F carry the stresses longitudinally thereof from the hub to the rim and as these spokes are in tension and there are no appreciable bends therein, their strength is greatly increased.

In use, when the wheel is traveling over hard ground, it will be wholly supported by the outer rim portions B and B', but whenever it is traveling over soft ground, the cleats H will be brought into action.

What I claim as my invention is:

1. A wheel comprising a rim having flat outer edge portions spaced by a central depressed annular portion, cross cleats secured to said depressed portions, and spokes connected to the sides of said depressed portion.

2. A wheel comprising a rim having outer edge portions spaced by a central depressed annular portion, cross cleats secured to said depressed portion and having their outer edges within the radius of said outer edge portions, and spokes connected to the sides of said depressed portion.

3. In a wheel, a rim having outer edge portions spaced by a central annular depressed portion with obliquely arranged portions connecting the same, cleats extending transversely of said central depressed portion with their outer edges within the radius of said outer edge portions of the rim, and spokes secured to said obliquely connecting portions and extending substantially in the plane thereof.

In testimony whereof I affix my signature.

THOMAS C. WHITEHEAD.